United States Patent [19]
Reyes

[11] Patent Number: 6,076,716
[45] Date of Patent: *Jun. 20, 2000

[54] HANGER ASSEMBLY

[76] Inventor: Daniel Reyes, 1658 Ashton Ct., Miami, Fla. 33145

[ * ] Notice: This patent is subject to a terminal disclaimer.

[21] Appl. No.: 09/075,713

[22] Filed: May 11, 1998

Related U.S. Application Data

[63] Continuation-in-part of application No. 08/380,037, Jan. 30, 1995, Pat. No. 5,749,505.

[51] Int. Cl.[7] ............................ B60R 11/00; B60R 7/00; B60R 9/00
[52] U.S. Cl. .................... 224/482; 224/276; 224/927; 223/94; 248/308
[58] Field of Search ................... 224/276, 482, 224/901, 901.2, 927; 223/89, 90, 94; 248/308

[56] References Cited

U.S. PATENT DOCUMENTS

| | | | |
|---|---|---|---|
| 2,557,537 | 6/1951 | Ellison | 224/482 |
| 4,863,081 | 9/1989 | Gabbert | 224/550 |
| 5,145,098 | 9/1992 | Tung | 223/94 |
| 5,480,076 | 1/1996 | Siegel et al. | 223/94 |
| 5,749,505 | 5/1998 | Reyes | 224/482 |

Primary Examiner—Henry J. Recla
Assistant Examiner—Timothy L. Maust

[57] ABSTRACT

A foldable garment hanger capable of being selectively positioned between a folded position, to facilitate storage and carrying, and an expanded position to facilitate removable support of a garment thereon. Two body portions are pivotally attached to one another so as to be selectively positioned between the folded and expanded positions wherein each body portion includes an arm member having an arm extension for varying the length of the arm thereby making the hanger assembly adaptable for garments of various sizes and increasing a collapsibility thereof. A support assembly is secured to the body of the hanger assembly and is structured to support the hanger with a garment thereon in a depending, suspended position from a supporting structure such as within an automobile or like vehicle or other more conventional location. A handle assembly is selectively positionable relative to a remainder of the hanger body between a stored position and an operative position and is structured to effectively lock the hanger body in its expanded position when the handle assembly is in its operative position. Alternately, the handle assembly is cooperatively structured with a remainder of the garment body so as to facilitate disposition of the hanger body from its expanded position into the folded position when the handle assembly is in its stored position.

30 Claims, 6 Drawing Sheets

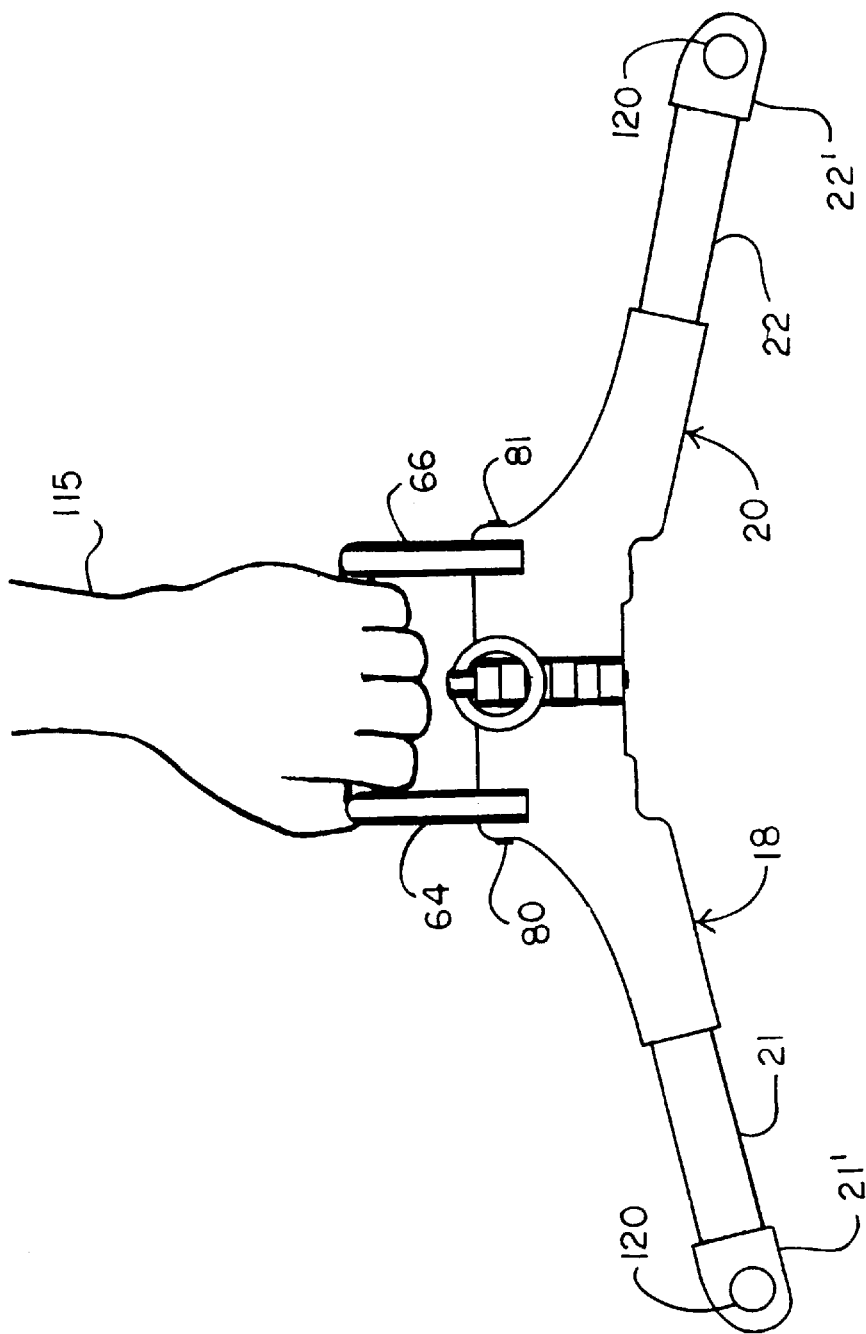

HANGER ASSEMBLY

BACKGROUND OF THE INVENTION

This is a continuation-in-part application of application Ser. No. 08/380,037 filed on Jan. 30, 1995 which is to issue into U.S. Pat. No. 5,749,505 on May 12, 1998.

FIELD OF THE INVENTION

The present invention relates to a garment hanger structured to be selectively disposed in either a folded position for storage and transport or into an expanded position for the removable support of a garment thereon. The hanger structure may be adapted for use inside an automobile or like motor vehicle as well as for the support of a garment in a more conventional location such as a closet or the like.

DESCRIPTION OF THE RELATED ART

Conventional garment hangers vary greatly in size, configuration and overall design, but do include generally standard features or components common to most hanger structures. Typically, a conventional garment hanger is formed of a rigid material wherein the various components are fixedly secured to one another. More specifically, two arm members generally extend outwardly from a central portion of the garment hanger, which is in turn connected to a supporting hook or like structure designed to removably support the hanger, as well as a garment thereon, to some type of supporting structure such as found in a domestic closet or the like. These conventional hangers are formed from a variety of substantially rigid materials which enable the removable support of a jacket, shirt, sweater, etc. about the arms in underlying, but supporting relation to the shoulder portions of such garments. In addition, conventional hanger structures often include a rigid material cross bar extending beneath and in interconnecting relation to opposite ends of the aforementioned arm members. Such cross bars are normally disposed and structured for the removable support of trousers or like garments thereon wherein a garment type structure may be supported in addition to and independently of a garment which overlies the outwardly extending arms of the conventional hanger body.

While hanger structures of the type set forth above are operative for their intended function, certain disadvantages do exist with the use thereof. For example, the size of such conventional hanger structures do not normally render them convenient for compact carrying in suitcases, briefcase, or the like. In addition, known hanger structures, of the type set forth above, are not particularly adapted for efficient use within automobiles or like vehicles for the removable and temporary support of a jacket or like garment while the vehicle is travelling. Moreover, conventional hanger structures having the structural components thereof fixedly attached to one another can normally not be adapted to accommodate garments of varying dimensions and/or configurations.

In order to overcome certain disadvantages set forth above, attempts have been made to design a partially collapsible garment hanger which is capable of being disposed into a somewhat collapsed position of reduced size and configuration by folding down the hook portion when the hanger structure is not being used to support a garment thereon, and/or by retracting the arms of the hanger. However, such known attempts to accomplish a collapsible hanger structure have limited collapsibility and do not generally accomplish a substantially portable and compact design, and have generally resulted in overly complex structures which, while considered to be generally operative for their intended function, frequently themselves include certain disadvantages in their prolonged or continuous use. For example, known collapsible hanger structures frequently include removable parts and/or structural components movably attached to one another in a manner which generally weakens and therefore renders unreliable the overall hanger structure in terms of structural integrity. Furthermore, known collapsible structures are not always adapted for use with heavier items, such as coats, or in a variety of different environments such as for the support of a variety of different types of garments in an automobile or like motor vehicle. Accordingly, the complexity, limited collapsibility, structural design and the various components and the interconnection of such components frequently render such known, collapsible hanger structures too impractical and expensive for the consuming public, thereby reducing the overall popularity to the consuming public.

Based on the above, there is a need in the art for a garment hanger capable of being selectively positioned between a substantially folded position, for storage, and an expanded position, for use, which overcomes many if not all of the disadvantages of the type set forth above, with conventional hangers and known collapsible hanger structures. The invention as disclosed in the above set forth patent represents an improvement over such known hanger structures, and further, the present invention as described in greater detail hereinafter represents further improvements in a modified structure which is capable of use in a variety of environments including but not limited to automobiles or like motor vehicles.

SUMMARY OF THE INVENTION

The present invention relates to a foldable hanger assembly which is particularly structured for use in removably supporting a garment on an appropriately positioned supporting member within an automobile or like motor vehicle. In addition, the structure of the present invention has sufficient versatility for use in a more conventional environment such as a closet or other area where garments are normally stored. The subject invention, therefore, comprises a hanger body which is selectively positionable between a folded position and an expanded position. The folded position may generally be defined by the hanger body as well as its various components being disposed in a relative orientation of sufficiently reduced dimension and/or configuration. This folded position facilities storage in a variety of locations including but not limited to a suit case, brief case or the like. To the contrary, the expanded position, is generally defined as an orientation of the various structural components of the hanger body which facilitates the removable support of a garment, such as a jacket, shirt, sweater, etc. in a substantially suspended position. In addition, and as will be explained in greater detail hereinafter, the hanger body and particularly the arm members thereof may be enlarged to the extent of increasing the length of each arm member so as to accommodate a normal garment, or if further extended to accommodate larger size garments.

The hanger body further includes two base portions secured at generally the proximal end of each of the arm members and disposed in movable interconnection to one another through the provision of a first pivot assembly. The pivot assembly is disposed so as to allow relative, selective movement of the base members and accordingly the arm members attached thereto between the aforementioned folded position and expanded position. For purposes of clarity, the folded position may generally be defined as the front surfaces of the arm members and the corresponding attached base portions being disposed in generally confronting relation to one another. Similarly, the expanded position may generally be defined as the arm members and respective base portions extending outwardly from one another, and preferably purposely disposed in a somewhat angular orientation, such that the arm members and associated base portions are disposed in non-coplanar or non-linear relation to one another. Such an angular orientation will facilitate secure support of the garment on the hanger structure when in its expanded position, while also maintaining the facilitated, "automatic" positioning of the hanger assembly into a folded position as the garment is removed from its supported position thereon.

Another feature of the present invention is the provision of a handle assembly which is selectively disposable between a stored position and an operative position. The handle assembly comprises two handle segments which are movable relative to one another and also movable with one another as the handle assembly is disposed between the aforementioned stored position and operative positions. The handle assembly is cooperatively structured with a remainder of the hanger body and particularly the first pivot assembly associated with and serving to pivotally interconnect the base portions so as to effectively "lock" the hanger assembly in its expanded position when the handle assembly is disposed in its operative position. The operative position of the handle assembly is more specifically defined as an upwardly and outwardly extending orientation of the handle assembly wherein the handle segments comprising the handle assembly are relatively disposed to facilitate carrying of the hanger and any garment thereon in the hand of the user. The handle assembly may also serve to support the hanger on any applicably configured supporting member such as in a vehicle or from a closet or the like.

However, the normal support for the hanger assembly when in its expanded position, is accomplished through the provision of a supporting assembly. The supporting assembly includes a loop, hook or like support member secured to an upper portion of the hanger body generally adjacent to or in direct interconnection with the first pivot assembly that serves to pivotally interconnect the base portions as set forth above. The support member associated with the supporting assembly is thereby positionable so as to removably engage any type of support found in a vehicle, closet, etc. and accordingly may take a variety of configurations which facilitate the removable attachment of the hanger body in a somewhat conventional suspended orientation for the removable support of garment thereon.

Accordingly, it is a primary object of the present invention to provide a hanger assembly capable of being selectively positioned between a substantially compact, folded position for storage and an expanded position for use in supporting a garment thereon.

Another primary object of the present invention is to provide a foldable hanger assembly capable of being supported or mounted within an automobile or like vehicle as well as other more conventional environment such as a closet or the like.

Yet another important object of the present invention is to provide a foldable hanger assembly having certain structural components which can be selectively enlarged to accommodate garments of larger sizes or configurations.

Still another object of the present invention is to provide a foldable hanger assembly which incorporates a handle assembly or equivalent structure which facilitates the carrying of the is hanger when in its expanded position by the hand of the user.

It is also an important object of the present invention to provide a foldable hanger assembly which is capable of being effectively locked or maintained in its expanded position to prevent inadvertent collapse thereof while supporting a garment thereon.

Yet another object of the present invention is to provide a foldable hanger assembly that permits a user to remove a garment therefrom with a minimum amount of time and effort expended.

Still another important object of the present invention is to provide a foldable hanger assembly which is easy to manipulate when selectively positioning between the folded and expanded positions.

It is also an important object of the present invention to provide a foldable hanger assembly which is inexpensive to manufacture and maintain and is formed of a durable construction so as to provide a long operative life thereof.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 7 is a rear view of the hanger assembly of the present invention illustrating use of the handle assembly.

Like reference numerals refer to like parts throughout the several views of the drawings.

DETAILED DESCRIPTION OF THE PREFERRED EMBODIMENT

Figure 1:
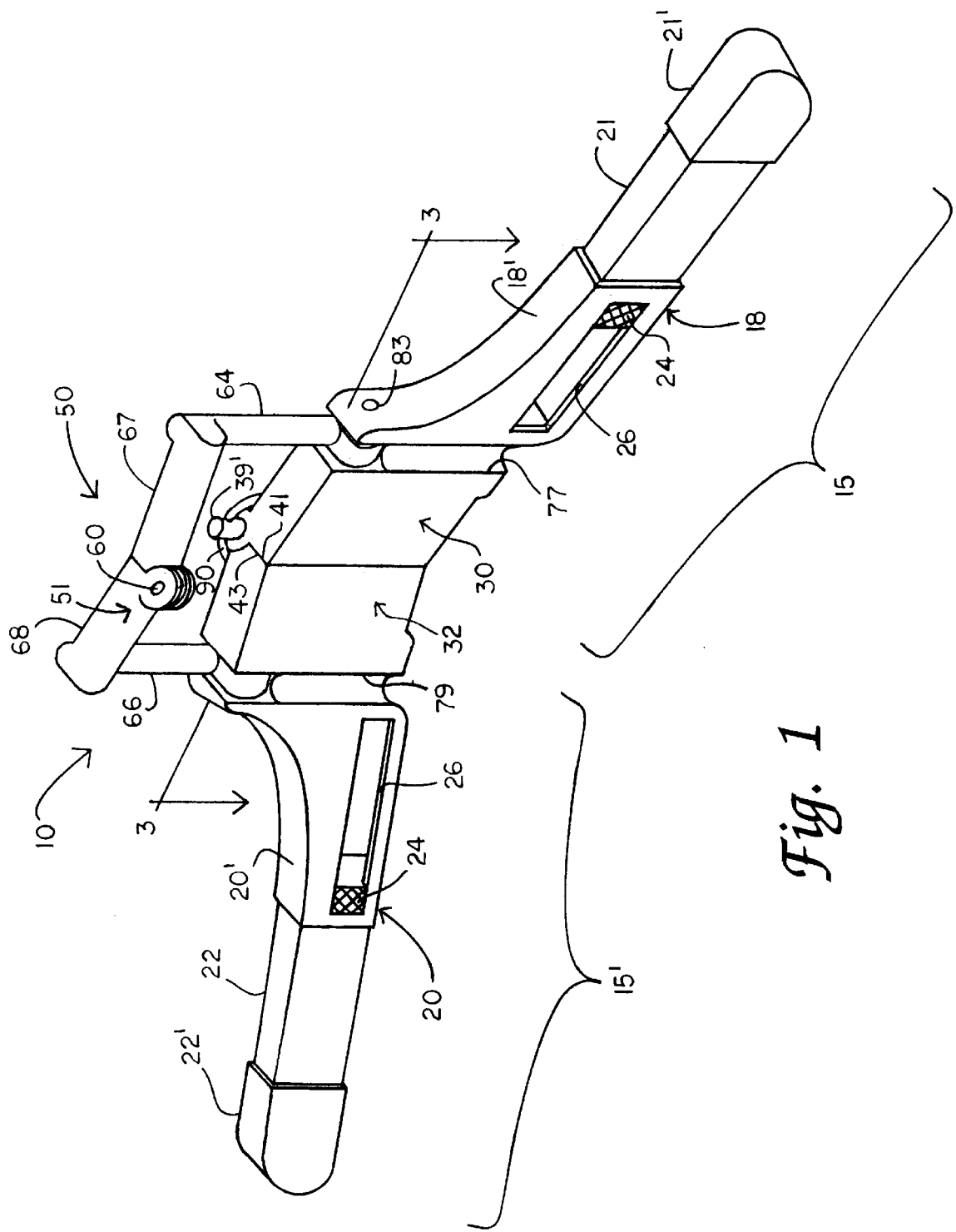
FIG. 1 is a perspective view of the assembled hanger assembly in its expanded position.
Figure 4:
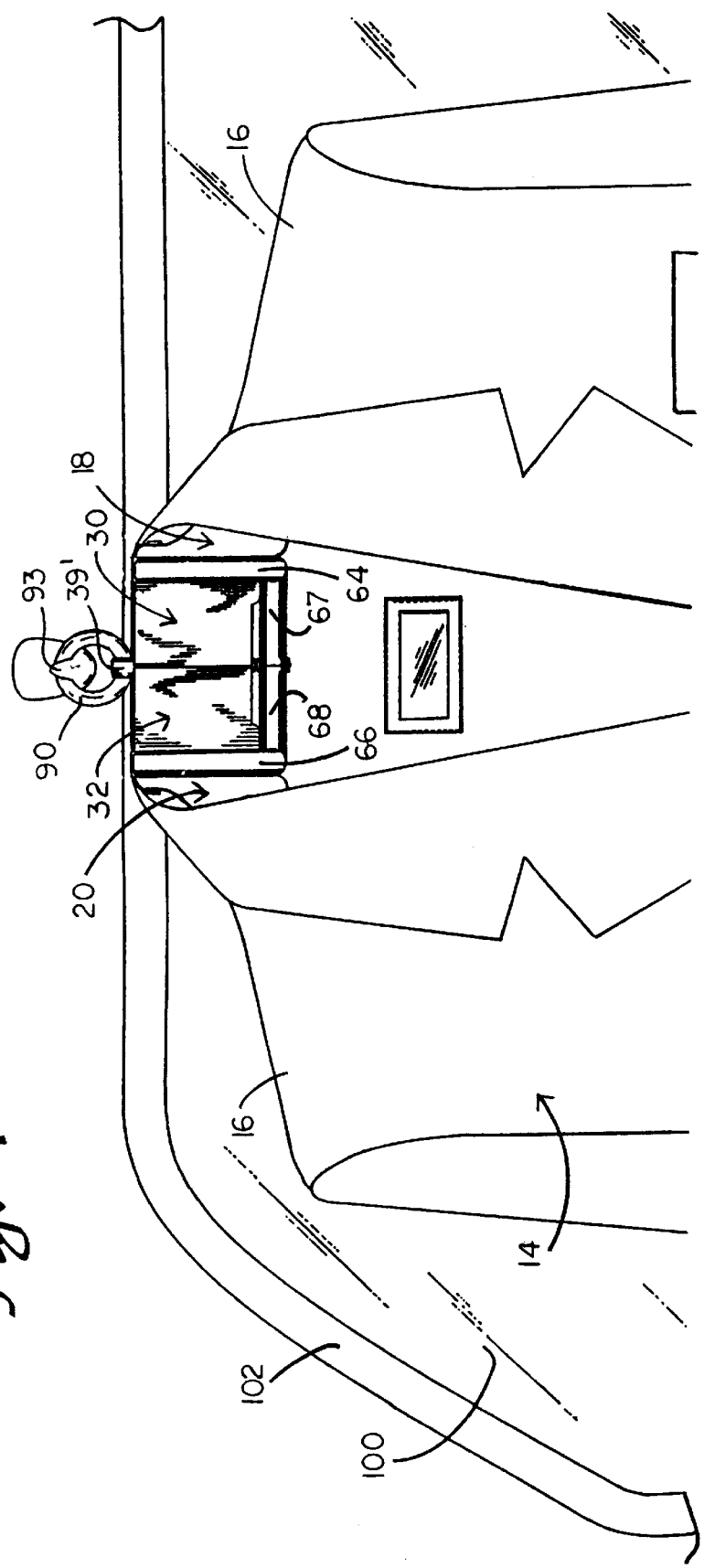
FIG. 4 is a front view of the hanger assembly with a garment supported thereon in partial cutaway.
Figure 5:
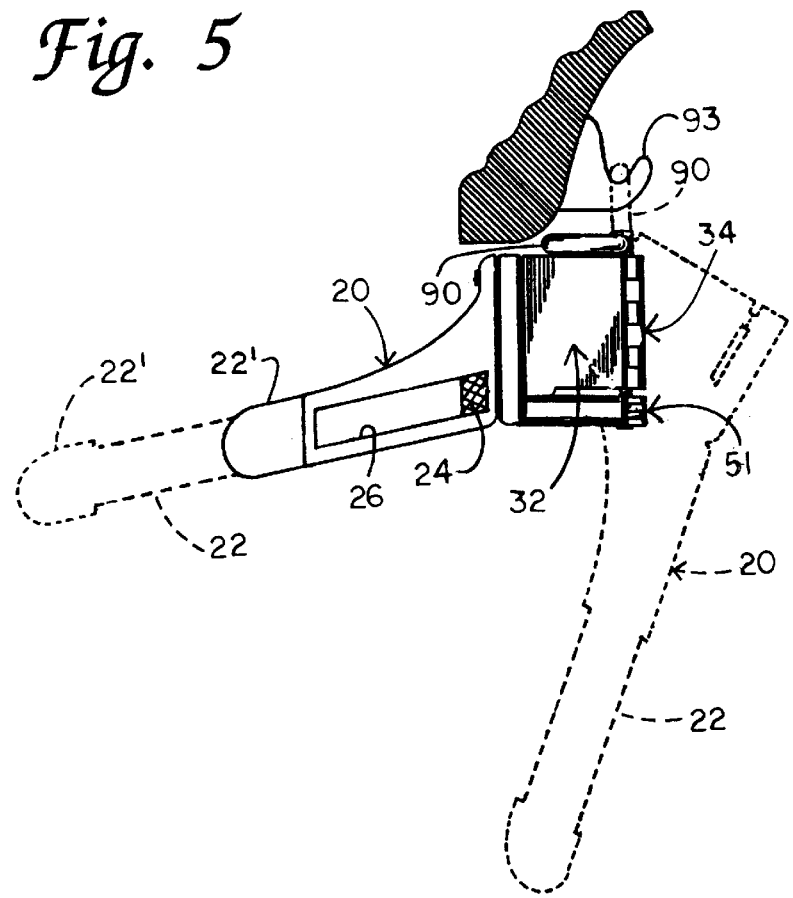
FIG. 5 is a side view in partial phantom of the hanger assembly of the present invention in a folded position.
Figure 6:
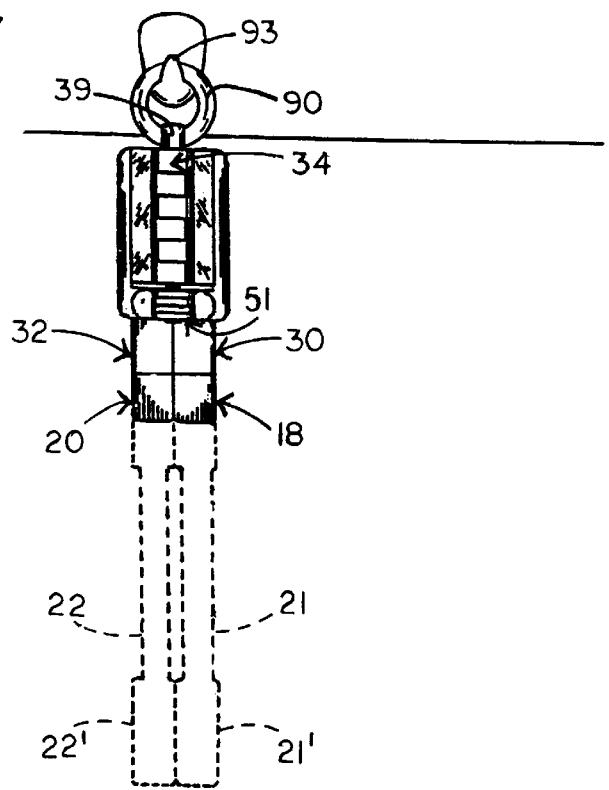
FIG. 6 is a front view in partial phantom of the embodiment of FIG. 5.

As shown in the accompanying Figures, the present invention relates to a hanger assembly, generally indicated as 10. The hanger assembly 10 includes a hanger body, generally indicated as 12, that is capable of being selectively positioned between an expanded position, as shown in FIG. 1, and a folded position, as shown in FIGS. 5 and 6. As should be apparent, the expanded position is adapted to support a garment 14 (See FIG. 4) thereon such that the shoulder portions 16 of the garment 14 are generally supported by arm members 18 and 20 of the hanger body 12 in what may be considered a generally conventional manner.

As such, it is evident that the hanger body 12 of the hanger assembly 10 preferably includes a first body portion 15 and a second body portion 15' extending in generally opposite directions from one another. Included respectively with the first and second body portion 15 and 15' are a pair of arm members 18 and 20. Furthermore, in the illustrated preferred embodiment, the arm members 18 and 20 each include an arm interior segment 18' and 20' and an arm extension 21 and 22. The arm extensions 21 and 22 are structured to be selectively positioned between an outwardly extended position, as shown in FIG. 1, and an inwardly, substantially retracted position, as at least partially shown in FIGS. 5 and 6, relative to the corresponding arm interior segments 18' and 20'. Accordingly, it should be clear that the arm extensions 21 and 22, as incorporated into the preferred embodiment, can effectively vary the length of the arm members 18 and 20 by easy manipulation, and can be substantially retracted so as to significantly reduce an overall length of each arm member 18 and 20 and increase the effective collapsibility. Further, the elongation of the arm members 18 and 20 will also therefore clearly accommodate garments 14 having a conventional size or even of a larger size and/or unusual configuration is sufficient extendibility is provided for.

Each of the arm extensions 21 and 22 are preferably structured to be telescopically connected to the arm interior segments 18' and 20' of the arm members 18 and 20, and are preferably slidingly disposed within an interior portion thereof so as to move relative to the arm interior segments 18' and 20' and achieve the respective extended and retracted positions. More specifically, in the illustrated preferred embodiment, a channel is defined in the interior portion of the arm interior segments 18' ad 20' and is structured to receive the arm extensions 21 and 22 therein Furthermore, an outward projection 24 preferably extends outwardly from an exposed surface of each of the arm extensions 21 and 22 and is dimensioned and configured to fit within an elongated slot 26 defined in each of the arm interior segments 18' and 20'. Accordingly, the movement and/or positioning of each of the arm extensions 21 and 22 relative to the arm interior segments 18' and 20' is limited by the projection 24 coming into engagement with opposite ends of the elongated slot 26, as clearly shown in both FIGS. 1 and 2. Further, the distal end portions 21' and 22' of the arm extensions 21 and 22 have a somewhat enlarged configuration so as to restrict the inward travel of the arm extensions 21 and 22 relative to the arm interior segments 18' and 20'. The enlarged dimension and configuration of the distal end portions 21' and 22' also facilitate a removable but somewhat gripping engagement with the interior portions of the garments 14 as they are suspended beneath the shoulder portions 16 of the garment.

The first and second body portions 15 and 15' of the hanger body 12 of the present invention further include a base portion 30 and 32. Specifically, the base portions 30 and 32 generally define a central region of the hanger body 12 from which the arm members 18 and 20 extend. Furthermore, the base portions 30 and 32 are pivotally coupled to one another so as to achieve the aforementioned selective positioning of the hanger body between the expanded position of FIG. 1 and the folded position of FIGS. 5 and 6. More particularly, the base portions 30 and 32 are fixedly secured to the proximal end of each of the arm members 18 and 20, as shown, such that the base portion 30 and the arm member 18 to which it is attached move with one another relative to the opposite base portion 32 and arm member 20.

Relative positioning of the base portions 30 and 32 as well as the aforementioned arm members 18 and 20 occurs by virtue of a first pivot assembly generally indicated as 34. The first pivot assembly 34 of the illustrated embodiment includes a pivot portion 36 preferably connected to the base portion 32 and a pivot portion 38 preferably coupled to the base portion 30. The pivot assembly 34 also includes an elongated pivot pin as at 39 which is axially received within both of the pivot portions 36 and 38 when aligned in coaxial relation to one another.

Figure 2:
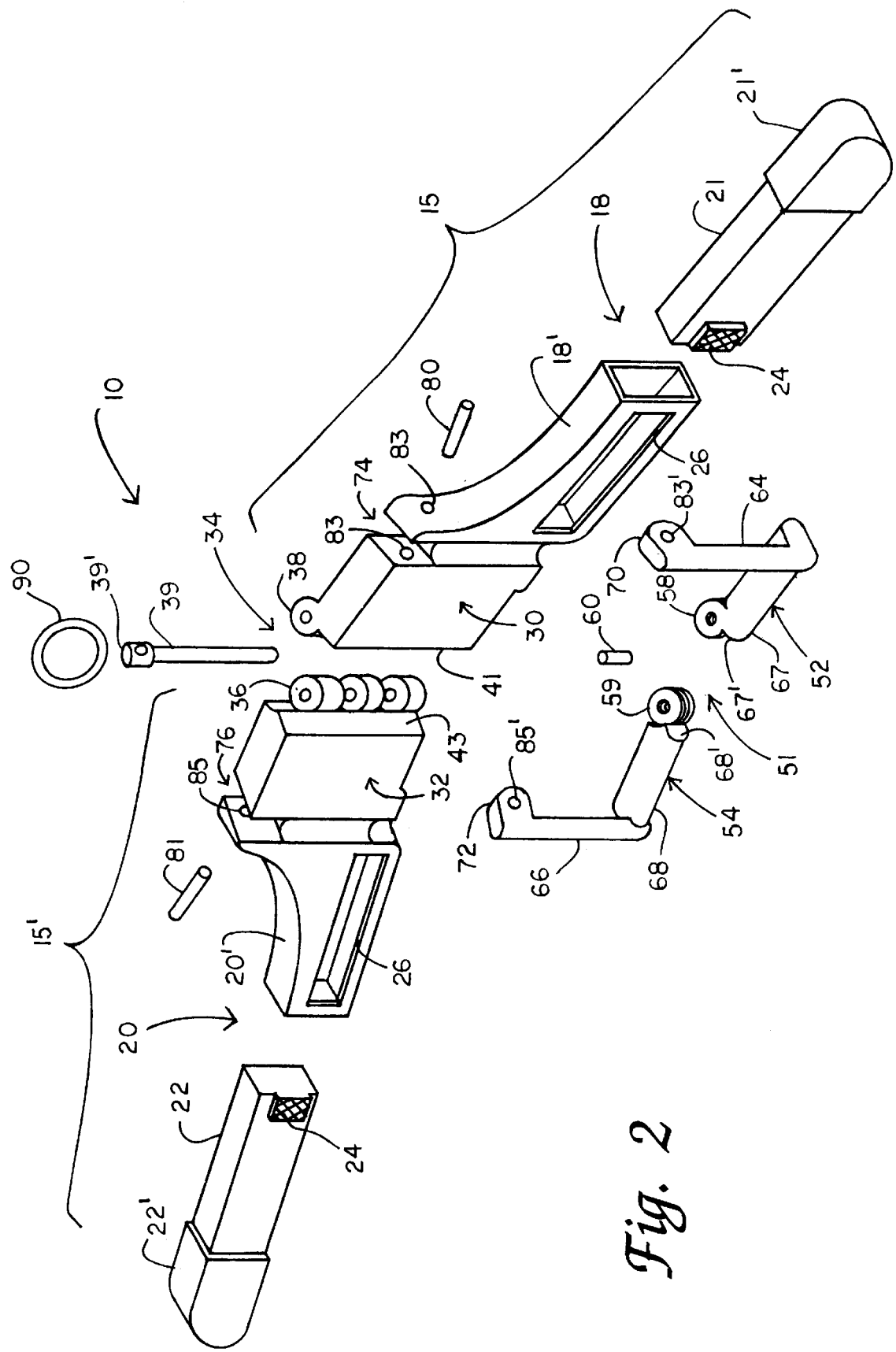
FIG. 2 is a perspective view in exploded form showing the relations between the various structural components of the subject hanger assembly.
Figure 3:
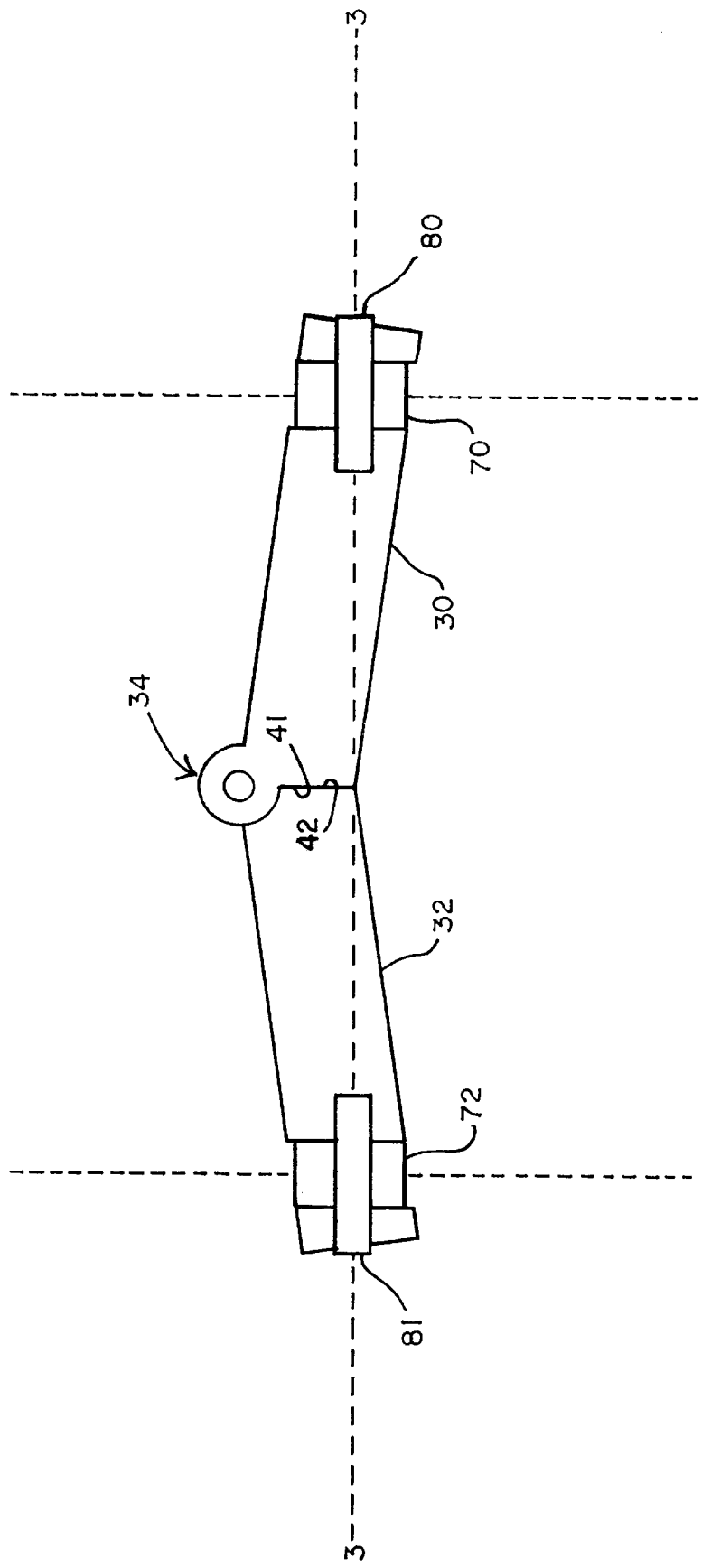
FIG. 3 is an sectional view along line 3—3 of FIG. 1.

Another feature associated with base portions 30 and 32 includes the provision of a first stop assembly including cooperatively positioned surfaces 41 and 43. More specifically, although a substantially straight expanded position could be effectively achieved with the present invention, the preferred embodiment illustrated in the figures includes stop surfaces 41 and 43 disposed at somewhat of an angular orientation, as best shown in FIGS. 1 and 2. More specifically, these stop surfaces 41 and 43 are preferably integrally formed in the interconnected ends of the base portions 30 and 32 and are relatively positioned to be forced into abutting, confronting engagement with one another as shown in FIG. 1. This engagement limits or stops the travel of the first and second body portion 15 and 15' relative to one another when traveling in a direction opposite the folding direction, and determines the angular orientation or alignment of the first and second body portions 15 and 15' when in the preferred expanded position of FIG. 1. Furthermore, such a configuration provides greater stability in the expanded position, as the base portions 30 and 32 and arm members 18 and 20 must travel beyond the 180 degree aligned position in order to collapse into the folded position. Also, such an angular orientation achieves a more effective contour for retaining a jacket or coat.

Another feature of the present invention is the provision of a handle assembly generally indicated as 50, and illustrated in its operative position in FIG. 7. The handle assembly 50 includes two handle segments 52 and 54, which are pivotally interconnected and movable relative to one another by virtue of a second hinge assembly 51. Preferably, the second hinge assembly 51 includes hinge portions 58 and 59 which may be axially aligned and joined together through the provision of a pivot pin 60. Preferably each of the handle segments 52 and 54 have a somewhat L-shaped configuration including arm members 64 and 66 having one end fixedly or integrally attached to transverse members 67 and 68. Moreover, the outer or distal end of each of the arm members 64 and 66 terminates in pivot members 70 and 72, each of which are adapted to be pivotally interconnected to the hanger body 12, preferably between the respective base portions 30 and 32 and arm members 18 and 20. Indeed, a pair of cutout portions 74 and 76 are preferably defined in the hanger body 12 into which the pivoted interconnection of the handle segments 52 and 54 occurs. Each of the cutout portions 74 and 76 each define a spacing between In the respective arm members 18 and 20 and the base portions 30 and 32 and provide for a flush engagement when the handle assembly 50 is in its stored position. Furthermore, the cutout areas 74 and 76 are specifically dimensioned to receive the pivot members 70 and 72 therein and allow pivotal movement of the pivot members 70 and 72 by virtue of the existence of two pivot pins 80 and 81. The respective pivot pins 80 and 81 extend through apertures and/or passages 83 and 85 formed as best shown in FIG. 2. It is important to note that in the preferred embodiment wherein the hanger body 12 is structured to define an angular orientation when in its expanded position, the pivot pins 80 and 81 are disposed in an angular orientation relative to the longitudinal access of the respective base portions 30 and 32 and arm members 18 and 20. This angular orientation of the pivot pins 80 and 81 is structured to facilitate movement of the handle assembly 50 between the operative position shown in FIG. 1 and the stored position shown in FIG. 4. In particular, because the base portions 30 and 32 and arm members 18 and 20 pivot beyond the 180 degree alignment, an aligned positioning of the pivot pins 80 and 81 would result in the pivot pins 80 and 81 being angled relative to one another when the hanger body 12 is in the fully expanded position. Of course, such a relative, angular positioning of the pivot pins 80 and 81 would define a divergent and non-aligned axis of rotation which would not function to permit the necessary pivoting of the handle assembly 50. Furthermore, the handle segments 52 and 54 are preferably limited in their rotation too far beyond the 180 degree plane due to a second stop structure including stop surfaces as at 67' and 68' preferably integrally formed on the distal end of the transverse members 67 and 68 immediately adjacent to the hinge portions 58 and 59. These stop surfaces 67' and 68' are forced into abutting, confronting engagement with one another as best shown in FIG. 1 in order to limit or restrict relative pivotal movement of the transverse members 67 and 68 to one another in the opposite direction.

Also the present structure of the handle assembly 50, when in its operative position, is such that an outwardly spaced relation substantially above the engaged bases 30 and 32 is achieved so as to facilitate the gripping thereof by the hand 115 of a user whether or not a garment 14 is supported on the hanger body. Further, due to the relative dispositions of the second pivot assembly 51, serving to pivotally interconnect the handle segments 52 and 54 in its angular orientation, as shown in FIG. 1, to the first pivot assembly 34, in its angular orientation, the hanger body is "locked" or restricted from movement out of its expanded position as shown in FIG. 1 into the folded or collapsed position as shown in FIGS. 5 and 6. More specifically, when in the handle assembly 50 is in its stored position and the hanger body is in its expanded position, the structure of the first pivot assembly 34 and second pivot assembly 51 are such that the angles defined respectively by the hanger body 12 and the handle assembly 50, in the preferred embodiment are generally aligned with one another. When, however, the handle assembly is moved to its operative position, it is essentially inverted relative to the hanger body 12 such that the defined angles now oppose one another. This opposed orientation thereby necessitates that closure of the first pivot assembly 34 be in a direction opposite to closure of the second pivot assembly 51, such that the handle assembly 50 in its operative orientation essentially locks the hanger body 12 in the expanded orientation achieving a more stable configuration when the hanger assembly 10 is being carried by a user or is hung by the handle assembly 50.

Another feature of the handle assembly 50 is its flush positioning relative to the arm members 18 and 20 and the base members 30 and 32 of the hanger body 12. Such flush positioning, when the handle assembly 50 is in its stored position it is accomplished by virtue of the provision of elongated somewhat intended channels 77 and 79 preferably integrally formed generally at the junction between the fixed interconnection of the respective base portions 30 and 32 and the respective arm members 18 and 20.

Other structural features of the present invention comprises a support assembly, which, in the preferred embodiment of the accompanying Figures includes a support member 90 which is in the form of a loop type of support. It should be emphasized that the support member 90 may take the form of a loop, hook or other configuration which would facilitate the removable, somewhat suspended support of the hanger assembly 10 in the somewhat conventional orientation as shown in FIG. 4. Also with regard to FIGS. 4, 5 and 6, the hanger assembly 10 is shown mounted on the supporting member 93 itself being mounted on the interior of the vehicle wherein a door or window portion as at 100 is shown in confronting relation to the rear of the garment 14 and in somewhat facing relation to the rear surface of the hanger assembly. A supporting window or door frame 102 bounds the window or door 100 and the supporting member 93 is located there above. It should also be emphasized that the support assembly including the support member 90 could be structured and configured to allow or facilitate support of the subject hanger assembly within a more conventional location such as a closet or the like. In either embodiment, the support member 90 is preferably movably mounted at generally an upper portion of the hanger body 12, and in the preferred embodiment at the uppermost end 39' of the pivot pin 39 and is thereby associated with the first pivot assembly 34 in order to properly orient the hanger assembly in its conventionally suspended relation and in the orientation as shown in FIG. 4 when the hanger body is in its expanded position. In particular, suspension of the hanger body 12 from the support member 90 tends to lean the hanger body 12 into its expanded orientation in order to limit inadvertent folding thereof.

With regard to FIGS. 5 and 6, the removal of the garment 16 from the hanger assembly, such as when the door of a vehicle is opened is substantially facilitated by the structure of the present invention and will facilitate the "automatic" positioning of the hanger assembly into the folded position, once the handle assembly 50 is disposed in the stored position as shown in FIG. 4. Specifically, with the handle assembly 50 so positioned, the arm members 18 and 20 are free to move from the expanded position of FIG. 4 to the folded position of FIGS. 5 and 6 once the garment 14 is removed from its supported position. Moreover, the pulling of the garment 14 from the hanger body 12, such as at the collar of the garment 14, functions to pull the hanger body 12 into its folded position thereby substantially facilitating the removal of the garment with an easy tug, and tending to collapse the hanger body 12.

Further, as illustrated in FIG. 7, the present invention also preferably includes a securement structure to maintain the hanger assembly 10 in its folded position until affirmatively expanded. Preferably, this securement structure includes a pair of hook and loop fastener pads 120 correspondingly disposed on each of the first and the second body portions so as to engage one another when the hanger assembly 10 is in the folded position. Of course, hooks, clips, snaps, latches, or other alternative securement structures could also be provided. Furthermore, the securement structure is preferably disposed at the arm extensions, with such a structure facilitating even and simultaneous retraction and extension of the arm extensions so as to facilitate storage and deployment of the hanger assembly 10.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A foldable hanger assembly designed to removably support a garment thereon, said assembly comprising:

a) a hanger body selectively positionable between a folded position and an expanded position;

b) said hanger body includes a first body portion and a second body portion movable relative to one another between said folded and said expanded positions;

c) said first and said second body portions each include base portions and an arm member operatively extending from said base portions, d) a first pivot assembly pivotally interconnected to said base portions and is structured and disposed to movably orient said first and said second body portions relative to one another between said folded and expanded positions, e) a support assembly operatively disposed at generally an upper portion of said hanger body and structured and disposed to support said hanger body in a depending, suspended orientation relative thereto, and f) a handle assembly movably and operatively coupled to said hanger body and selectively positionable between a stored position and an operative position independent of said support assembly.

2. An assembly as in claim 1 wherein said support assembly comprises a support member connected to said hanger body and positionable outwardly from said hanger body into mountable engagement with a supporting structure.

3. An assembly as in claim 1 further comprising a securement structure structured and disposed to maintain said hanger body affirmatively in said folded position.

4. An assembly as in claim 1 wherein each of said arm members includes an arm extension structured and disposed to be selectively positionable between a retracted position and an extended position, each of said arm extensions structured to increase a length of a corresponding one of said arm members when in said extended position.

5. An assembly as in claim 4 wherein each of said arm extensions are movable along a length of a corresponding one of said arm members between said retracted and said extended positions.

6. An assembly as in claim 5 wherein each of said arm extensions are substantially telescopically mounted in a corresponding one of said arm members.

7. An assembly as in claim 5 wherein each of said arm extensions include a distal end portion structured and disposed to abuttingly engage a corresponding one of said arm members and thereby limit movement thereof into said retracted positions.

8. An assembly as in claim 1 wherein said handle assembly is disposed in an outwardly extending relation to said hanger body when in said operative position; said handle assembly structured for support of said body hanger independent of said support assembly.

9. An assembly as in claim 8 wherein said handle assembly is disposed in substantially confronting relation to said hanger body when said handle assembly is in said stored position.

10. An assembly as in claim 1 wherein said handle assembly comprises two handle segments movable with one another between said stored and operative positions and movable relative to one another during disposition of said hanger body between said folded and expanded positions.

11. An assembly as in claim 10 wherein said first and said second body portions include a channel defined therein in recessed relation to an exposed surface thereof, each of said channels disposed and configured to receive at least a portion of one of said handle segments therein in substantially confronting relation to a respective one of said body portions when said handle assembly is in said stored position.

12. An assembly as in claim 10 wherein said handle assembly comprises a second pivot assembly movably interconnected to said handle segments and movable with said handle assembly between said stored and operative positions, said second pivot assembly cooperatively structured with said first pivot assembly and disposed relative thereto when said handle assembly is in said operative position to restrict movement of said hanger body into said folded position and when in said stored position to achieve movement of said handle assembly with said hanger body into said folded position.

13. An assembly as in claim 1 wherein said handle assembly is structured to restrict movement of said hanger body into said folded position when said handle assembly is in said operative position.

14. An assembly as in claim 13 wherein said handle assembly includes two handle segments movably interconnected to one another by a second pivot assembly, said first and said second pivot assemblies being cooperatively structured and disposed to restrict movement of said hanger body into said folded position when said handle assembly is in said operative position.

15. An assembly as in claim 14 wherein said handle segments of said handle body are pivotally connected with said hanger body, said hanger body including a pair of pivot pins each connected to a different one of said first and second body portions and disposed to pivotally interconnect a different one of said handle segments to said hanger body.

16. An assembly as in claim 15 wherein said expanded position is defined by said first and said second body portions being disposed in a generally angular orientation relative to one another, thereby increasing a stability of said expanded orientation by requiring movement of said body portions beyond a 180° plane in order to move into said folded position.

17. An assembly as in claim 16 wherein each of said pivot pins are angularly oriented relative to a length of respective ones of body portions so as to facilitate disposition of said handle assembly in said operative position upon said body portions being disposed in said angular orientation of said expanded position.

18. An assembly as in claim 1 further comprising a first stop structure formed on said base portions in cooperative relation to said first pivot assembly, said first stop structure disposed and configured to restrict relative movement of said arm member in a predetermined direction to at least partially define said expanded position.

19. An assembly as in claim 18 wherein said first stop structure comprises cooperatively disposed surfaces formed on said base portions and structured for selectively positioning into abutting engagement with one another.

20. An assembly as in claim 19 wherein said cooperatively disposed surfaces are configured to dispose said body portions in a non-coplanar, generally angular orientation relative to one another when said hanger body is in said expanded position.

21. An assembly as in claim 18 further comprising a second stop structure formed on said handle segment in cooperative relation to said second pivot assembly, said second stop structure disposed and configured to restrict relative movement of said handle assembly in a predetermined direction.

22. An assembly as in claim 21 wherein said first and second stop structures are relatively disposable and cooperatively structured to restrict movement of said hanger body from said expanded position into said folded position when said handle assembly is in said operative position.

23. A foldable hanger assembly designed to removably support a garment thereon, said hanger assembly comprising:

a) a hanger body selectively positionable between a folded position and an expanded position;

b) said hanger body includes a first body portion and a second body portion movable relative to one another between said folded and said expanded positions;

c) said first and said second body portions each include base portions and an arm member operatively extending from said base portions, d) a first pivot assembly pivotally interconnected to said base portions and is structured and disposed to movably orient said first and said second body portions relative to one another between said folded and expanded positions, e) a handle assembly operatively coupled with said hanger body and selectively positionable between a stored position and an operative position, and f) said handle assembly being structured to restrict movement of said hanger body from said expanded position into said folded position when said handle assembly is in said operative position.

24. An assembly as in claim 23 wherein said expanded position is at least partially defined by a non-linear, generally angular orientation of said body portions relative to one another.

25. An assembly as in claim 24 wherein said handle assembly comprises two handle segments movable with one another between said stored and said operative positions and movable relative to one another during disposition of said hanger body between said folded and expanded positions; and further comprising a second pivot assembly structured and disposed to movably interconnect said handle segments with one another and to be movable with said handle assembly between said stored and operative positions, said second pivot assembly being cooperatively structured with said first pivot assembly and disposed relative thereto when said handle assembly is in said operative position so as to restrict movement of said hanger body into said folded position.

26. An assembly as in claim 25 wherein said handle segments of said handle body are pivotally connected with said hanger body, said hanger body including a pair of pivot pins each connected to a different one of said first and second body portions and disposed to pivotally interconnect a different one of said handle segments to said hanger body.

27. An assembly as in claim 26 wherein each of said pivot pins are angularly oriented relative to a length of respective ones of body portions so as to facilitate disposition of said handle assembly in said operative position upon said body portions being disposed in said angular orientation of said expanded position.

28. An assembly as in claim 24 further comprising a first stop structure formed on said first and second body portions in cooperative relation to said first pivot assembly, said first stop structure disposed and configured to restrict relative movement of said arm members in a predetermined direction to at least partially define said expanded position.

29. An assembly as in claim 28 wherein said first stop structure comprises cooperatively disposed surfaces formed on said base portions and structured for selective positioning into abutting engagement with one another; said cooperatively disposed surfaces being configured to orient said body portions in said non-linear, generally angular orientation with one another when said hanger body is in said expanded position.

30. An assembly as in claim 29 further comprising a second stop structure formed on said handle segments in cooperative relation to said second pivot assembly, said second stop structure disposed and configured to restrict relative movement of said handle segments in a predetermined direction; said first and second stop structures being relatively disposable and cooperatively structured to restrict movement of said hanger body from said exposed position into said folded position when said handle assembly is in said operative position.

* * * * *